United States Patent [19]
Roh

[11] Patent Number: 6,143,444
[45] Date of Patent: Nov. 7, 2000

[54] METHOD OF PREPARING AN ELECTRODE FOR LITHIUM BASED SECONDARY CELL

[75] Inventor: Whanjin Roh, Seoul, Rep. of Korea

[73] Assignee: Samsung Display Devices Co., Ltd., Kyungki-do, Rep. of Korea

[21] Appl. No.: 09/158,437

[22] Filed: Sep. 21, 1998

[30] Foreign Application Priority Data

Sep. 19, 1997 [KR] Rep. of Korea ............ 97-47727

[51] Int. Cl.[7] ............................................. H01M 4/26
[52] U.S. Cl. ................................. 429/217; 429/231.95
[58] Field of Search .......................... 429/217, 218.1, 429/231.8, 231.95, 233

[56] References Cited

U.S. PATENT DOCUMENTS

| | | | |
|---|---|---|---|
| 5,057,565 | 10/1991 | Noding et al. | 524/109 |
| 5,861,224 | 1/1999 | Barker et al. | 429/194 |
| 5,871,865 | 2/1999 | Barker et al. | 429/223 |
| 5,894,656 | 4/1999 | Menon et al. | 29/623.1 |
| 5,902,697 | 5/1999 | Guindy et al. | 429/153 |
| 5,961,671 | 10/1999 | Guindy et al. | 29/623.1 |
| 5,962,170 | 10/1999 | Mitchell | 429/316 |

FOREIGN PATENT DOCUMENTS

| | | |
|---|---|---|
| 0766331 | 4/1997 | European Pat. Off. . |
| 0789412 | 8/1997 | European Pat. Off. . |

*Primary Examiner*—Maria Nuzzolillo
*Assistant Examiner*—Monique Wills
*Attorney, Agent, or Firm*—Christie, Parker & Hale, LLP

[57] ABSTRACT

A method of preparing an electrode for a lithium based secondary cell including the steps of mixing an active material, a conductive agent, a binder and a plasticizer selected from soybean oil or dibutyl phthalate and applying the active material composition to a current collector is provided.

6 Claims, 1 Drawing Sheet

METHOD OF PREPARING AN ELECTRODE FOR LITHIUM BASED SECONDARY CELL

CROSS REFERENCE TO RELATED APPLICATION

This application is based on application No. 97-47727 filed in the Korean Industrial Property Office on Sep. 19, 1997, the content of which is incorporated hereinto by reference.

BACKGROUND OF THE INVENTION (a). Field of the Invention

The present invention relates to a method of preparing an electrode for a lithium based secondary cell, and more particularly, to a method of economically preparing an electrode for a lithium based secondary cell by a simple manufacturing process and for fabricating the lithium based secondary cell having a long lifetime.

(b). Description of the Related Art

Currently, the trend is to miniaturize and lighten portable electronics such as camera systems, audio systems, lap-top personal computers and cellular phones. Therefore, it is required to use cells having a small size, light weight and improved performance characteristics for such electronics.

As lithium satisfy such characteristics, lithium based secondary cells are generally used for that purpose. The lithium based secondary cell utilizes alkali metals such as lithium or carbon for negative active materials while using transition metal compounds for positive active materials. As an electrolyte, liquid or polymer electrolyte is used.

Among the lithium based secondary cells, a lithium ion cell are less chemically reactive and is safer than the other lithium based cells because it dose not contain metallic lithium. Furthermore, the lithium ion cell has relatively high operating voltage and a long cycle life. Owing to the characteristics, the demand of the lithium ion cell has increased in portable consumer electronics.

The lithium ion cell uses lithium-rich or lithium-source intercalation compounds for the positive active material, lithium-accepting or lithium-sink intercalation compounds for the negative active material, and liquid organic or polymer electrolyte. The cell using the liquid organic electrolyte is called a liquid lithium ion cell and the cell using the polymer electrolyte is called a solid-polymer lithium ion cell, a lithium ion polymer cell or a plastic lithium ion cell (PLIB).

An electrode of the lithium ion polymer cell is prepared from a mixture of an active material, a conductive agent, a binder and a plasticizer. The mixture is then applied to a glass substrate and cast into a film type. Thereafter, the resulting active material film is laminated with a current collector. However, the lamination method involves complicated processing steps and requires a higher production cost. Furthermore, an adhesive strength between the active material and the current collector becomes relatively loose.

SUMMARY OF THE INVENTION

An object of the present invention is to provide a method of preparing an electrode for a lithium based secondary cell with a simple manufacturing process.

Another object of the present invention is to provide a method of preparing an electrode for a lithium secondary cell showing a good adhesive strength between an active material and a current collector, resulting in enhanced lifetime of the cell.

In order to achieve these objects and others, in electrode preparation method according to the present invention, an active material composition is directly applied to a current collector. The active material composition is formed with an active material, a conductive agent, a binder and a plasticizer. In this method, the step of casting the active material composition into a film type on a separate glass substrate is no longer required.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
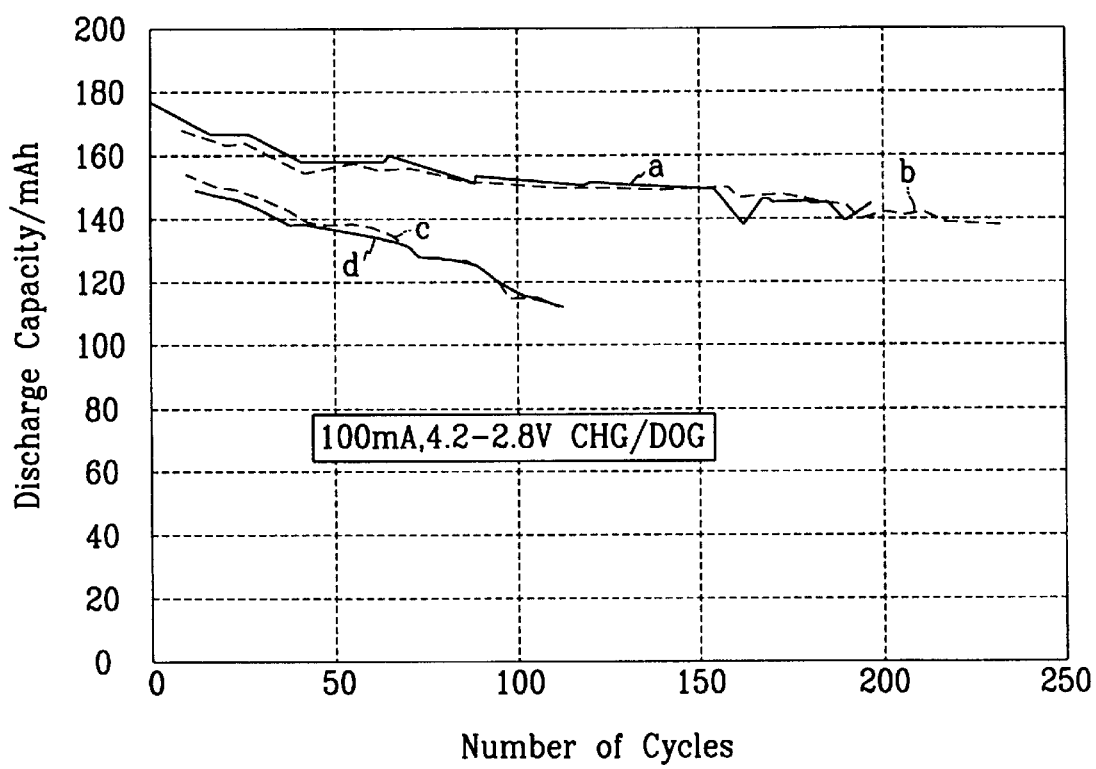
FIG. 1 is a graph illustrating discharge capacity curves as a function of the number of cycles of the lithium cells according to examples and comparative examples.

A rechargeable lithium ion cell includes a positive electrode, a negative electrode and an electrolyte. As previously stated, according to the phase type of the electrolyte, the lithium ion cell is classified into a liquid lithium ion cell whose electrolyte is liquid and a lithium ion polymer cell whose electrolyte is polymer. The electrode preparation method of the present invention may be applied to the both cells.

A method of preparing an electrode for the lithium based secondary cell of this invention will be now described in detail.

An active material, a conductive agent, a binder and a plasticizer are mixed in an organic solvent to prepare an active material composition. The active material composition is applied to a current collector to prepare an electrode.

The active material composition is conventionally cast into a film type before coating it on the current collector. That is, the active material composition is previously applied to a glass substrate and cast into a film type. Thereafter, the active material film is laminated with the current collector.

In contrast, in this inventive electrode preparation method, the active material composition is directly coated on the current collector. It can be easily known that this electrode preparation process is more simple than the lamination process, resulting in decreased production cost.

Furthermore, the adhesive strength between the active material composition and the collector becomes stronger because the active material composition is directly coated on the current collector.

The active material composition may be coated on both sides of the current collector to enhance efficiency of the electrode.

The current collector is preferably a perforated foil or a grid type collector. When those type collectors are used, lithium ions smoothly move back and forth between the positive and negative electrodes, increasing efficiency of the electrode and improving performance of the cell.

The plasticizer is to make perforations in the electrode. That is the plasticizer is extracted by using an organic solvent and forms a plurality of micro-spaces in the electrode. These micro-spaces increase the contact area between the active material and the electrolyte.

An epoxydized soybean oil or dibutylphthalate may be used for the plasticizer, and an epoxydized soybean oil having the formula 1 (manufactured and sold by Shindongbang cooperation, Korea) is used for that purpose. When the epoxidized soybean oil having the formula 1 is used for the plasticizer, the plasticizer can be easily removed from the electrode during the extracting step and, hence ion conductivity of the cell can increase. The epoxydized soybean oil is an environmentally affectionate.

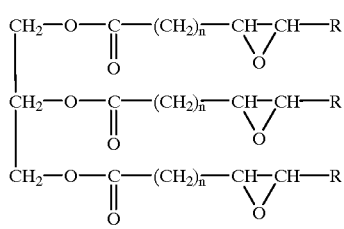

[Formula 1]

where R is an alkyl group and n is an integer of 1 to 10.

Among the active material composition, the conductive agent component includes carbon black, the binder component includes a polymer such as polyvinylidene fluoride and the organic solvent component includes acetone or N-methyl pyrrolidone.

For the clarification purpose, the positive and negative electrode preparation methods will be now separately described.

1) the positive electrode preparation method =p Transition metal oxide for an active material, a conductive agent, a binder and a plasticizer are mixed in an organic solvent to prepare an positive active material composition. The transition metal oxide include $LiCoO_2$, $LiNiO_2$, $LiMnO_2$, $LiMn_2O_4$ or $LiNi_{1-x}Co_xO_2$ (0<x<1). The plasticizer includes dibuthylphthalate or an epoxidized soybean oil having the formula 1.

The positive active material compositon is then coated on both sides of perforated aluminum foil or an aluminum grid for a current collector.

2) the negative electrode preparation method

Graphite or carbon for an active material, a conductive agent, a binder and a plasticizer are mixed in an organic solvent to prepare an negative active material composition. The plasticizer includes dibuthylphthalate or an epoxidized soybean oil having the formula 1.

The negative active material composition is then coated on both sides of a perforated copper foil or a copper grid for a current collector.

The present invention will be now explained in more detail by reference to examples and comparative examples.

EXAMPLE 1

Preparation of a Positive Electrode for a Lithium ion Polymer Cell 50 g of lithium cobalt dioxide ($LiCoO_2$) powder for an active material was mixed with 4 g of carbon black powder for a conductive agent to produce a powder mixture. 7 g of polyvinylidene fluoride for a binder was dissolved in 100 g of N-methyl pyrrolidone for an organic solvent and 10 g of an epoxidized soybean oil having the formula 1 for a plasticizer was added thereto to prepare a mixture composition.

The mixture composition was added to the powder mixture and mixed to obtain a uniform paste to prepare an active material composition. The active material composition was directly coated on both sides of the perforated aluminum foil for a current collector to prepare a positive electrode.

Preparation of a Negative Electrode for a Lithium ion Polymer Cell 30 g of graphite powder for an active material was mixed with 1 g of carbon black powder for a conductive agent to prepare a powder mixture.

5 g of polyvinylidene fluoride for a binder was dissolved in 50 g of N-methyl pyrrolidone for an organic solvent and 10 g of an epoxidized soybean oil of formula 1 for a plasticizer was added thereto to prepare a mixture composition.

The mixture composition was added to the powder mixture and mixed to obtain a uniform paste to prepare an active material composition. The active material composition was directly coated on both sides of he perforated copper foil for a current collector to prepare a negative electrode.

Fabrication of a Lithium ion Polymer Cell

A separator was prepared by using a copolymer of polyvinylidene fluoride and hexafluoropropylene. The positive electrode, the negative electrode and the separator were then laminated to prepare a laminated electrode group. The laminated electrode group was immersed two times in ether for 15 minutes to extract the plasticizer.

The electrode group was then immersed in a 1M electrolyte solution of $LiPF_6$ in ethylene carbonate (EC) and dimethylcarbonate (DMC) in a volume ratio of 2:1, and removed from the electrolyte. The electrode group was sealed in a polyethylene/aluminum foil sealant envelope to fabricate a lithium ion polymer cell.

EXAMPLE 2

Preparation of a Positive Electrode for a Lithium ion Polymer Cell

A positive electrode was prepared by the same procedure as in Example 1 except that lithium manganese tetraoxide ($LiMn_2O_4$) powder was used for an active material and an aluminum grid was used for a current collector.

Preparation of a Negative Electrode for a Lithium ion Polymer Cell

A negative electrode was prepared by the same procedure as in Example 1 except that a copper grid was used for a current collector.

Fabrication of Lithium ion Polymer Cell

A lithium ion polymer cell was fabricated by using the positive and negative electrode according to the same procedure as in Example 1.

EXAMPLE 3

Preparation of a Positive Electrode for a Lithium ion Polymer Cell

A positive electrode was prepared by the same procedure as in Example 1 except that dibuthylphtalate was used for a plasticizer and a aluminum grid was used for a current collector.

Preparation of a Negative Electrode for a Lithium ion Polymer Cell

A negative electrode was prepared by the same procedure in Example 1 except that carbon powder was used for an active material, dibuithylphthalate was used for a plasticizer and a copper grid was used for a current collector.

Fabrication of Lithium ion Polymer Cell

A lithium ion polymer cell was fabricated by using the positive and negative electrodes according to the same procedure in Example 1.

Comparative Example 1

Preparation of a Positive Electrode for a Lithium ion Polymer Cell 50 g of lithium cobalt dioxide ($LiCoO_2$) powder for an active material was mixed with 4 g of carbon black powder for a conductive agent to produce a powder mixture.

7 g of polyvinylidene fluoride for a binder was dissolved in 100 g of acetone and 10 g of dibutylphthalate for a plasticizer was added thereto to prepare a mixture composition.

The mixture composition was added to the powder mixture and mixed to obtain a uniform paste to an active material composition. The active material composition was then applied to a glass substrate and cast to form a thin film type having a thickness of 100 $\mu$m. Two sheets of the positive active material film was laminated on both sides of the perforated aluminum foil for a current collector to prepare a positive electrode.

Preparation of a Negative Electrode for a Lithium ion Polymer Cell 30 g of graphite powder for an active material was mixed with 1 g of carbon black powder for a conductive agent to produce a powder mixture.

5 g of polyvinylidene fluoride for a binder was dissolved in 50 g of acetone and 10 g of dibutylphthalate for a plasticizer was added thereto to prepare a mixture composition.

The mixture composition was added to the powder mixture and mixed to obtain a uniform paste to prepare an active material composition. The active material composition was then applied to a glass substrate and cast to form a thin film having a thickness of 100 $\mu$m. Two sheets of the negative active material film was laminated on both sides of the perforated copper foil as a current collector to prepare a negative electrode.

Fabrication of Lithium ion Polymer Cell

A separator was fabricated by using a copolymer of polyvinylidene fluoride and hexafluoropropylene. The positive electrode, the negative electrode and the separator were then laminated to prepare a laminated electrode group. The laminated electrode group was immersed two times in an ether to extract the plasticizer. The electrode group was then immersed in a 1M electrolyte solution of $LiPF_6$ in EC and DMC in a volume ratio of 2:1 and removed from the electrolyte. The electrode group was sealed in a polyethylene/aluminum foil sealant envelope to prepare a lithium ion polymer cell.

Comparative Example 2

Preparation of a Positive Electrode for a Lithium ion Polymer Cell

A positive electrode was prepared by the same procedure as in Comparative Example 1 except that lithium manganese oxide ($LiMn_2O_4$) powder was used for an active material, a thin film of an active material has a thickness of 120 $\mu$m and an aluminum grid was used for a current collector.

Preparation of a Negative Electrode for a Lithium ion Polymer Cell

A negative electrode was prepared by the same procedure as in Comparative Example 1 except that carbon powder was used for an active material, a thin film of an active material has a thickness of 120 $\mu$m and a copper grid was used for a current collector.

Fabrication of Lithium ion Polymer Cell

A lithium ion polymer cell was fabricated by using the positive and negative electrode according to the same procedure as in Comparative Example 1.

The discharge capacity according to the number of cycles of the lithium ion polymer cells fabricated from the examples and comparative examples were determined and the results are shown in FIG. 1. In FIG. 1, discharge-capacity curves a to b respectively show the discharge capacity as a function of the number of cycles of the lithium cells according to examples 2 to 3. Discharge-capacity curves c to d respectively show the discharge capacity as a function of the number of cycles of the lithium cells according to the comparative examples 1 to 2. As shown in FIG. 1, the lifetime of cells prepared by using the positive and negative electrodes of the present invention increases compared with that of the comparative examples.

As described above, the present invention can prepare the electrode by simple manufacturing process because the active material composition is directly applied to the current collector, resulting in reduced the production cost. Furthermore, the electrode of the present invention has a good adhesive strength between the collector and the active material so that the cell having a long time can be fabricated by using the electrode of this invention.

Furthermore, because the perforated foil or the grid is used for the current collector, lithium ions smoothly move between the electrodes and efficiency using the electrode increases, improving performance of the cell.

While the present invention has been described in detail with reference to the preferred embodiments, those skilled in the art will appreciate that various modification and substitutions can be made thereto without departing from the sprit and scope of the present invention as set forth in the appended claims.

What is claimed is:

1. A method of preparing an electrode for a lithium based secondary cell consisting essentially of the steps of:

mixing an active material, a conductive agent, a binder and a plasticizer selected from the group consisting of an epoxidized soybean oil and dibutylphthalate to produce an active material composition; and coating the active material composition onto a current collector.

2. The method of claim 1 wherein the current collector is a perforated foil type collector or a grid type collector.

3. The method of claim 1, wherein the plasticizer is an epoxidized soybean oil.

4. The method of claim 3 wherein the epoxidized soybean oil has the formula 1

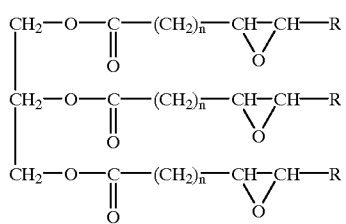

where R is an alkyl group and n is an integer from 1 to 10.

5. The method of claim 1 wherein the active material is coated onto both sides of the current collector.

6. A method of preparing an electrode for a lithium based secondary cell comprising the steps of:

mixing an active material, a conductive agent, a binder, an organic solvent and a plasticizer selected from the group of an epoxidized soybean oil and dibutylphthalate to produce an active material composition in the form of a paste; and applying the active material composition in the form of a paste to a current collector.

* * * * *

UNITED STATES PATENT AND TRADEMARK OFFICE
CERTIFICATE OF CORRECTION

PATENT NO.    : 6,143,444
DATED         : November 7, 2000
INVENTOR(S)   : Whanjin Roh It is certified that error appears in the above-identified patent and that said Letters Patent is hereby corrected as shown below:

<u>Column 8,</u>
Line 7, after "group" insert -- consisting --.

Signed and Sealed this

Second Day of April, 2002

Attest:

JAMES E. ROGAN
Attesting Officer        *Director of the United States Patent and Trademark Office*